F. G. SARGENT.

Wool Washer.

No. 9,632. Reissued March 29, 1881.

Witnesses

N. P. Ockington

George A. Wilber

Inventor

F. G. Sargent.

by his Atty.

Lewis C. Rice.

N. PETERS, PHOTO-LITHOGRAPHER, WASHINGTON, D. C.

UNITED STATES PATENT OFFICE.

FREDERICK G. SARGENT, OF GRANITEVILLE, MASSACHUSETTS.

WOOL-WASHER.

SPECIFICATION forming part of Reissued Letters Patent No. 9,632, dated March 29, 1881.

Original No. 227,928, dated May 25, 1880. Application for reissue filed December 13, 1880.

*To all whom it may concern:*

Be it known that I, FREDERICK G. SARGENT, of Graniteville, in the county of Middlesex and State of Massachusetts, have invented certain Improvements in Wool-Washing Machines, of which the following is a specification.

The objects of my invention are to provide a machine which may accommodate itself to irregularities in the feeding of the wool to it, which will permit of a considerable amount being in the bowl soaking while the mechanism continues to operate upon the mass and take therefrom that which has been soaked and washed sufficiently; to provide a machine having a set of carrier or delivery rolls which will even out and thin the sheet of fiber as it passes from the scouring-liquid to the squeeze-rolls, and to provide such delivery-rolls with a return-apron, upon which any falling wool will be reconveyed immediately to the body of the bowl. I accomplish these objects by the mechanism illustrated in the accompanying drawings, in which—

Figure 1:
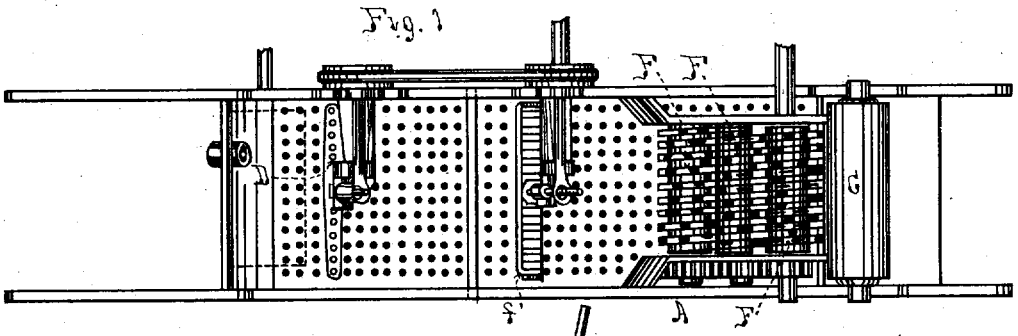
Figure 2:
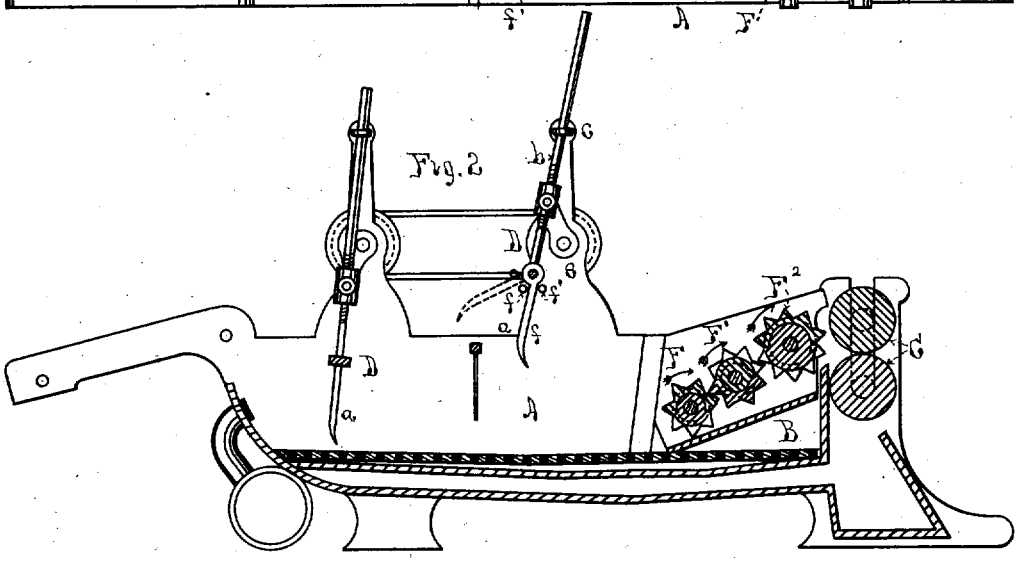
Figure 4:
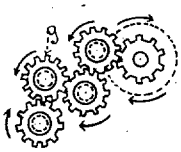
Figure 3:
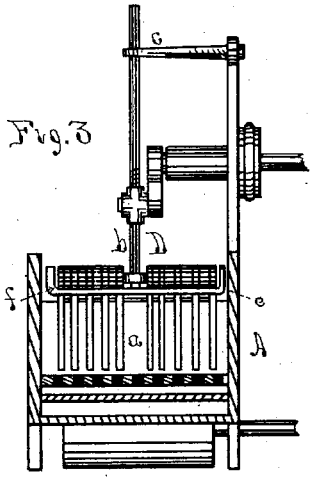

Figure 1 is a top-plan view of a machine embodying my invention. Fig. 2 is a longitudinal vertical section. Fig. 3 is a cross-section, showing the rake in elevation. Fig. 4 is an elevation of the train by which the carrier-rolls are driven.

A is the bowl which contains the scouring-liquid, and into which the wool is thrown to be operated upon by the rakes D D, which agitate and stir it in the liquid, and propel it toward the squeeze-rolls C. These rakes are operated in the usual well-known manner by having a staff whose center is attached to a sleeve mounted upon the wrist-pin of a crank, with the upper end of the staff sliding in a fixed guide.

*e* is the rake-head attached to the staff *b*.

*a a* are the teeth or tines swinging upon the rake-head, having eyes in their upper extremity large enough to slip upon the round head *e*, and properly spaced or held apart by having washers or spacers slipped upon the head between the tines.

*f* is a spring extending across the rake from side to side behind the tines, and secured to the ends of the rake-head *e*. This spring serves to hold the tines forward in an operative position, and a like spring, *f'*, bearing against them in front, serves to hold them from swinging forward in advance of their desired position, but permits them to swing forward if subjected to any considerable strain from the rear.

The teeth may be hung in any other suitable manner, and springs of any other suitable form and arrangement employed provided the same action of teeth is secured.

The springs are given ample strength, so that while they will hold the tines against any ordinary resistance in substantially the same direction as the line of the rake-staff they will, if subjected to a greater resistance acting against them from before or behind, yield sufficiently to relieve the machine of much of the strain which would be brought upon it if the tines were rigid, or nearly so, so that when the mass of wool, from sudden addition to its quantity, by irregular feeding or other causes, becomes very great in advance of the rakes, instead of crowding against them until either the machine is stopped or broken, or an excessive quantity thrown out of the bowl onto the carrier at one time, the tines will yield even to the extent of sliding over the mass if it offer sufficient resistance to overcome the spring sustaining them. There will, therefore, when the tines come in contact with large masses of wool surcharged with the fluid contained in the tank, be less strain upon the machine, because the tines will yield so that the mass will be started forward more gradually, and as the tines crowd against the mass soaking in the bowl it will be agitated and stirred and moved about in the scouring-liquid, so that when delivered the dirt and foreign substances will be loosened and removed, or in a condition to be removed, when the liquid with which the wool is saturated is squeezed out by the squeeze-rolls C, much more effectually than would be the case if the wool were fed rapidly through the machine or left soaking in a bowl in which no mechanism was used to constantly push and agitate it.

It is to be understood, regarding the action of the yielding tines, that they are to be capable of yielding in such manner and to such an extent that they may pass over the mass of fiber, and they are not to be confused with teeth which are made of slightly elastic material, so as to yield to a very limited extent.

F F′ F² are the carrier-rolls, which take the wool, after it has been moved through the bowl by the swinging rakes, and convey it up from the liquid to the squeeze-rolls. These carrier-rolls are mounted transversely to the bowl, above the inclined plate or apron B, and have their ends provided with pinions acting in connection with intermediate idle-pinions *g*, Fig. 4, whereby they are all caused to rotate in one direction, so as to take the wool and carry it forward toward the squeeze-rolls upon their upper faces. The carrier-rolls are so made and adjusted that the surface-speed of each successive roll is greater than that of its predecessor, either by driving each roll faster than its predecessor or by making each successive roll larger in diameter than that of the one preceding it, and driving all at an equal rate, which method is used in the mechanism illustrated in the drawings. The rolls are provided with teeth, which take hold of the fibers of the wool and draw it from one roll to the other toward the squeeze-rolls; and as each roll has an accelerated movement the fibers of the wool are disentangled and straightened and loose foreign substances permitted to drop out, and the liquid more perfectly drained from the mass than would be the case if a carrier of any of the heretofore-known kinds were used.

By arranging the lines of teeth of one roll to work between those of the rolls next to it the wool has a more nearly level surface to pass over than if the rolls were farther apart with their operative peripheries moving outside of one another, and the teeth acting upon the wool engage with the fibers during a smaller part of their revolution, and during such a part as they act more nearly in the plane of the general direction of movement of the wool from the tank to the squeeze-rolls, and therefore have less tendency to cling to the wool and carry small fragments down between the rolls.

By constructing the rolls with spirally-arranged teeth, each succeeding tooth of each roll rises into contact with the wool in a path different from the tooth which precedes it, and therefore the pull of the roll which evens out the mass of wool comes upon other fibers than those already taken hold of by the preceding teeth, thus lessening the tendency to break the fibers and increasing the efficiency of the machine to even out the mass into a sheet before it reaches the squeeze-rolls.

The advantages over the plain roll-carrier which the toothed roll-carrier possesses consist in seizing the mass of wool more quickly when first presented to it saturated with greasy scouring-liquor, a condition in which a plain roll would have almost absolutely no hold upon it; in holding onto the wool while the succeeding roll draws upon and evens out the mass; in preventing heavy masses from passing forward to the squeeze-rolls without being evened and thinned down by the accelerated movement of the surfaces of the successive rolls, and in more thoroughly clearing the fibers passing over it of foreign substances and the scouring-liquid. With the smooth roll-carrier, the wool, having but little adhesion to the roll on account of the greasy nature of the liquid which is carried upon the rolls and which covered them, could not be evened out thoroughly, because any mass having any great cohesion or solidity would, as it passed from one roll to another, first slip upon that faster-moving roll, and then, when that roll obtained a greater hold upon it, slip on the one with which it was before moving, it would be thus forwarded toward the squeeze-rolls as a mass, being accelerated instead of being evened out into a sheet, and instead of having its fibers pulled upon and straightened, and the dirt and other foreign matter allowed to fall out and the liquid to drain from the fiber very thoroughly, as it does in my improved device.

The apron B serves the purpose of preventing the separated fibers, which occasionally adhere to the carrier-rolls and are taken down between them and then drop off, from accumulating with dirt in a mass in the rear end of the tank, for when they fall, with the dirt, upon the apron they will be pushed by the under teeth of the rolls back toward the tank, and by the first roll back into it, while the dirt will drop through the opening in the apron, and these falling separated fibers thereby be saved.

While the method described of passing the wool over the upper surface of the rolls is the one preferred by me, the carrier-rolls may, if desired, be rotated in the opposite direction, and the wool carried toward the squeeze-rolls beneath the carrier-rolls.

What I claim as new and of my invention is—

1. In a wool-washing machine, the combination of a bowl or tank and a circulating rake or carrier to advance the fiber in the bowl, provided with backwardly-yielding teeth having a spring-support, whereby the forward pressure upon the fiber is maintained within proper limits.

2. In a wool-washing machine, the combination of a bowl or tank and a circulating rake or carrier to advance the fiber, having forwardly-yielding spring-supported teeth, substantially as described, whereby the loosening of the fiber during the backward travel of the rake is prevented.

3. In an organized machine for washing wool, the combination of a bowl or tank and a carrier-rake therein, provided with a series of pivoted teeth, and a single spring, applied in the manner described and shown, to retain all the teeth normally in an operative position.

4. In a wool-washing machine, a carrier consisting of a number of toothed rolls, each rotating faster than its predecessor, substantially as described.

5. In a wool-washing machine, a carrier consisting of a number of rolls of different sizes, provided with spirally-arranged teeth placed upon all the rolls in spirals having the same pitch, substantially as described.

6. In a wool-washing machine, a carrier having rolls provided with teeth arranged in rows which pass between the rows of teeth on the adjacent rolls, substantially as described.

7. In a wool-washing machine, the combination of a carrier having toothed carrying-rolls with an inclined apron, substantially as described.

FREDERICK GRANDERSON SARGENT.

Witnesses:

ARTHUR B. PLIMPTON,

ALLAN C. SARGENT.